Patented May 19, 1942

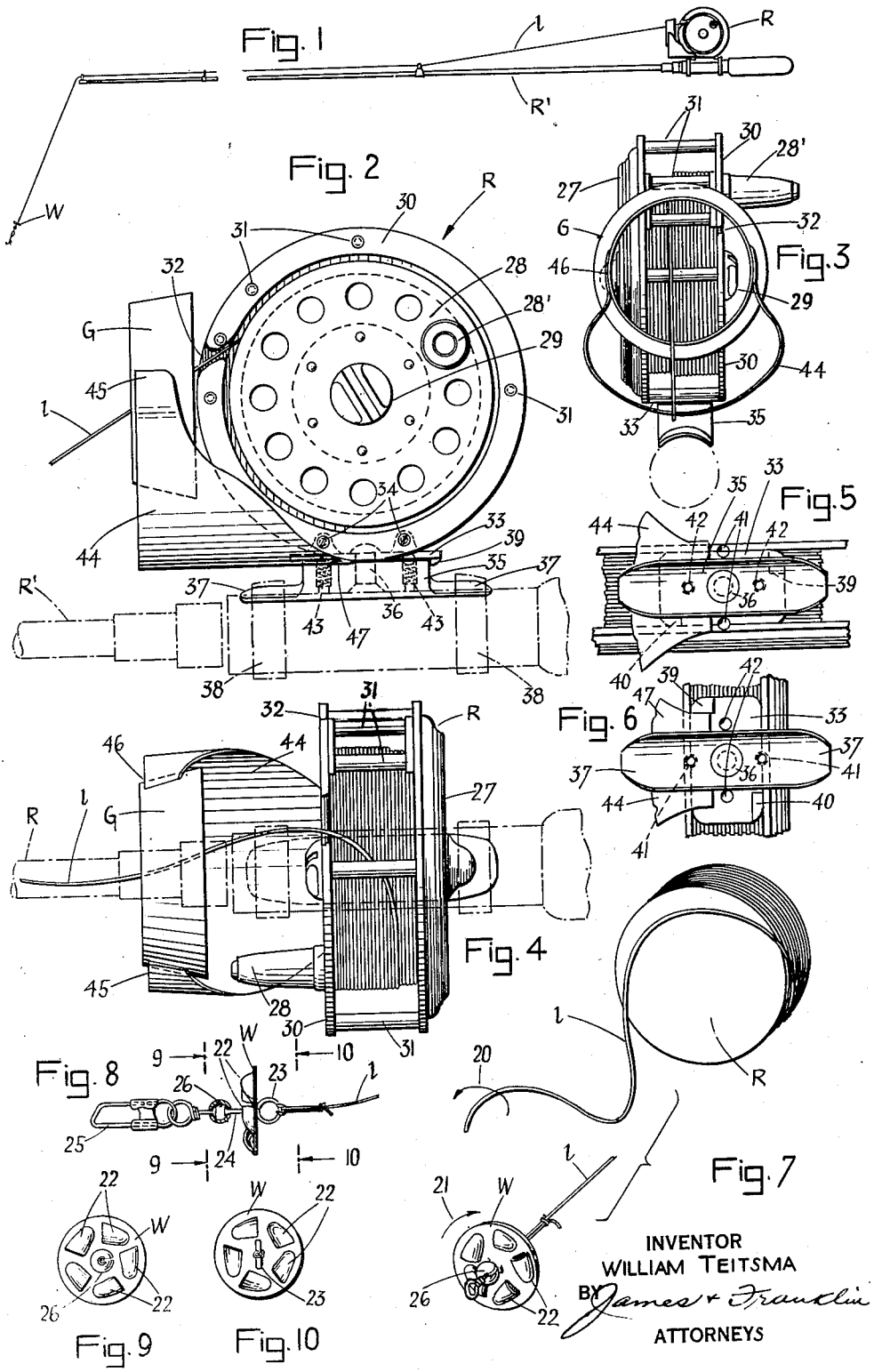

2,283,773

UNITED STATES PATENT OFFICE 2,283,773

FISHING ROD AND REEL

William Teitsma, Paterson, N. J., assignor of one-third to Henry De Haan, and one-third to Harry Dykstra, both of Paterson, N. J.

Application September 15, 1941, Serial No. 410,823

4 Claims. (Cl. 43—20)

This invention relates to an improved fishing rod and reel.

It has heretofore been suggested for a casting reel or a flyrod reel to mount the reel on the rod in such a way as to permit the fishing line to be unwound from the end of the reel and thus without spinning or rotating the reel itself; and various constructions of fishing reels have been devised to carry out this suggestion. The advantages of such a reel are that overrunning of the reel during a casting operation is avoided, undesirable "backlashing" is obviated, and a longer and more accurate cast is obtainable. In spite of these recognized advantages, reels embodying this suggested construction have not been found or deemed practical.

I have found that the most serious drawback to all of the forms of reels hitherto suggested which permit the unwinding of the line from the end of the reel and thus without spinning or unreeling the reel, is that when the line is unwound from the reel end, a twist is imparted to the line in a direction opposite to the unwinding direction, which twist remains in the line during the rewinding or re-reeling thereof and is responsible for the line becoming entangled and knotted in use. I have found that this most serious drawback may be solved; and a principal object of my present invention centers about the provision of a reel of the character described in which means is provided for eliminating the twist in the line produced by the unwinding operation.

Another disadvantage in reels of this structure is that due to the centrifugal unwinding action of the line at the reel, there is a tendency for the line to be thrown or to fly out laterally of the rod and sometimes with sufficient force as to become engaged with and entangled by the rod. I have found that this defect may also be cured in a simple way. A further prime object of the present invention resides in the provision of a guard means associated with the reel, which serves or functions to prevent the line from flying out transversely into engagement with the rod, and thereby obviating entanglement between line and rod at the reel.

By means of both features of the structure of my present invention, the line when a cast is made is prevented from becoming entangled with the rod and the twist produced in the line is eliminated therefrom when the line is rewound on the reel. A perfect casting operation may, therefore, be made and similar repeated casting operations may be made with the integrity of the line maintained throughout its use. These improvements, therefore, enable this type of reel to come into practical use.

To the accomplishment of the foregoing and such other objects as may hereinafter appear, the invention relates to the combination rod and reel and to the sub-combinations thereof hereinafter sought to be defined in the claims and described in this specification in connection with the appended drawing in which:

Figure 1 is a side elevational view of the general assembly of the rod and reel;

Figure 2 is a similar view shown on an enlarged scale of the reel of the present invention, showing the same in a rewinding or re-reeling position;

Figure 3 is an end elevational view thereof shown in the same position;

Figure 4 is a top plan view thereof showing the reel in a line unwinding position;

Figure 5 is a bottom plan view with parts broken away of the reel position shown in Figure 2;

Figure 6 is a view similar to Figure 5, but corresponding to the reel position of Figure 4;

Figure 7 is a perspective schematic view of the unwinding operation, the twisting action produced thereby, and the device of the present invention for eliminating the produced twist therein;

Figure 8 is a side elevational view of this untwisting device;

Figure 9 is a view thereof taken in cross-section in the plane of the line 9—9 of Figure 8; and Figure 10 is a view thereof taken in cross-section in the plane of the line 10—10 of Figure 8.

Referring now more in detail to the drawing, one form of reel structure designed to permit the fishing line to be unwound from the reel end and, therefore, without spinning or rotating the reel itself comprises, a reel R mounted on a fishing rod R', the reel R being movable on the rod between a position with the reel axis transverse to the rod as illustrated in Figure 2 of the drawing and a position with the reel axis parallel to the rod as illustrated in Figure 4 of the drawing. In the axis transverse position shown in Figure 2, the reel may be rotated for rewinding or reeling the line $l$ thereon, and in the axis parallel position shown in Figure 4 of the drawing, the line $l$ may be unwound or stripped from the reel from the reel end, the reel itself being maintained stationary during this unwinding or stripping operation. The reel R is mounted as usual at the handle end of the rod and the rod as usual is provided with the line guiding means, as clearly shown in Figure 1 of the drawing.

The most serious drawback to this form of reel as heretofore pointed out is that when the line $l$ is unwound from the reel end, a twist is imparted thereto, which twist remains in the line during the rewinding or re-reeling thereof and is responsible for the line becoming entangled and even knotted in use. This twist that is imparted to the line is in a direction opposite to the unwinding direction. This is indicated in Figure 4 of the drawing and is more particularly shown in a schematic way in Figure 7 of the drawing to which reference may now be had. When the line $l$ is unwound from the reel R in the clockwise direction portrayed in Figure 7 of the drawing, a twist is imparted to the line corresponding in degree to the number of windings in the reel, the said twist being in the opposite or counter-clockwise direction as indicated by the arrow 20. When the line is re-reeled or rewound, this twist remains therein and is the cause of the undesirable line entanglement and knotting.

I have found that this line twisting may be eliminated by providing a device which acts to untwist the line and completely remove the twist therein so that the line may be rewound or re-reeled in straightened condition. I have found that this may be accomplished by a device attached to the line which is acted upon by the water as the line is pulled during a normal fishing operation to rotate in a direction opposite to the produced twist in the line and to thereby return the line to a straightened state. This I accomplish by the use of a water wheel W which preferably is attached to the cast end of the line $l$ as is illustrated, for example, in Figure 7 of the drawing, the water wheel W having its vanes so directed that it will be rotated by the water in a clockwise direction as illustrated by the arrow 21 when a pull is exerted in the line $l$. As shown in Figure 7 of the drawing, this direction of rotation is opposite to the rotation or twist produced in the line $l$ and, therefore, the rotative action of the water wheel functions to remove or eliminate the undesirable twist in the line. The size of the water wheel and the vane construction thereof are such that the water wheel will rotate in the water only under the impulse or strain of the torsional stress in the line due to the twist thereof. The wheel will, therefore, only act so long as the line is twisted and will not operate to produce a twist or torsion in the line in the other direction.

The water wheel W and its attachment to the line $l$ is best shown in Figures 8 to 10 of the drawing. This water wheel consists simply of a circular plate having a plurality of small vanes 22, 22 struck out therein, the direction of the vanes being such as to impart the described rotation under the pull of the twisted line $l$. To one face of the water wheel is fixedly secured an eyelet 23 to which the end of the line $l$ is attached. Extending in the other direction from the eyelet 23 is a pin 24 which is secured to the usual type of fish lure 25 by means of a ball joint or connection 26.

The reel R itself may be of any standard construction, modified only so as to permit the described swiveling movement thereof on the rod R'. A standard form of reel is shown in the drawing comprising a reel plate 27 rotatably supporting the spool or reel proper 28 rotatable by a handle 28', the reel being secured to the plate by means of a headed locking screw 29, the reel being surrounded by a cage formed by the circular member or ring 30 and the circumferentially arranged spacing rods 31, 31. The circular member or ring 30 is provided with a break or slot 32 therein which functions to permit the line $l$ to move between the positions shown in Figures 2 and 4 of the drawing as the reel is moved between the positions shown in these figures. In other words, when the reel is moved to the axis parallel position shown in Figure 4, the line $l$ feeds out or moves through this break or slot 32 so that the line may be readily stripped or unwound from the reel end and conversely when the reel is moved to the axis transverse position shown in Figure 2, the line moves back through this break or slot 32 into the re-reeling position. By this modification of this standard reel the ring 30 is utilized as a circular guard confining the line against lateral throw at the reel cage.

For swivelly mounting the reel on the rod, I provide a base plate 33 attached to two spacing rods 34, 34 in the reel cage, and a swivel mount 35 for swivelly mounting the plate 33 by means of a swivel pin 36. The swivel mount 35 is concaved at its bottom to fit the part of the rod R' to which it is attached, and is provided with the oppositely extending wings 37, 37 which latter may be secured to the rod part by means of straps 38, 38. To limit the movement of the reel to a quadrant rotation, and to yieldingly lock or hold the reel in the positions of Figure 2 and Figure 4, the following stop and holding means are provided. The plate 33 is provided with the diametrically positioned stop elements 39 and 40 which are adapted to engage suitable parts of the swivel mount 35, as best indicated in Figures 5 and 6 of the drawing. This plate 33 is also provided with two sets of perforations, one set being designated as 41 and the other set as 42, each set being adapted to register with the spring pressed protruding balls 43, 43, housed by the swivel mount 35. As shown in Figure 5 of the drawing, the set of perforations 42, 42 are shown in locking registry in Figure 5 of the drawing, and the set of perforations 41, 41 are shown in locking registry in Figure 6 of the drawing.

As above set forth, due to the centrifugal unwinding action of the line $l$ at the reel R, there is a tendency for the line to be thrown or to fly out laterally of the rod and sometimes with sufficient force as to become engaged with and entangled by the rod. This is so in spite of the use of the guard ring 30. I have found that this centrifugal movement of the line at the reel may be effectively broken by providing a guard positioned substantially immediately in advance of the reel and yet spaced sufficiently therefrom to break this centrifugal movement. To accomplish this, I employ an annular guard G preferably frusto-conical in shape, which is held in fixed position on the rod R', the line $l$ threading through said guard, as clearly shown in Figures 2 to 4 of the drawing. This guard G is held a short distance from the reel R and cooperates with the reel R in either of its positions. The guard G is held in this position by means of a shield member 44 to the opposite ends of which, 45 and 46, the guard G is attached, this shield member being secured at its base 47 to the swivel mount 35. This shield member, which in part embraces the line at its region of emergence from the reel, also helps to break the centrifugal action thereof at this region and thus to confine the line to the desired movement. With the use of this guard, the line is effectively prevented from flying transversely into any engagement with the rod and thus completely eliminates estanglement with the rod.

The manner of constructing and using the fishing rod and reel of my present invention will in the main be fully apparent from the above detailed description thereof. When a cast is to be made, the reel is moved to the position shown in Figures 4 and 6 of the drawing and the line is cast. The reel will remain stationary, and the line will be stripped therefrom. No unreeling will take place and, therefore, over-running and backlashing are eliminated. An accurate and long cast is thereby obtained. The guard G acts to break the local centrifugal action of the line at the reel and, therefore, to confine the line to its desired movement preventing the same from becoming entangled with the fishing rod. After a casting is made, the reel is moved to the rewinding position shown in Figures 2, 3 and 5 of the drawing. As a pull is exerted on the line during partial or full re-reeling, the water wheel W, under the action of the twist produced in the line $l$, rotates to remove or eliminate the twist in the line. Any type of water wheel may be employed or any device equivalent thereto which will effect the rotation of the line and eliminate the twist therein. The line when re-reeled is returned to the reel in fully straightened condition.

While I have shown my improved fishing rod and reel in the preferred form, it will be obvious that many changes may be made in the structure without departing from the principles of the invention described or as defined in the following claims.

I claim:

1. In a fishing rod and reel, a fishing rod, a reel mounted thereon, a fishing line on said reel guided by said rod, means for reeling the reel to wind or rewind the line, means for permitting unwinding of said line from the end of said reel without spinning or reeling the wheel, and a device for eliminating the twist in the line produced by the unwinding of the same from the reel end, said device comprising a water wheel attached to the cast part of the line, said water wheel being rotative in the water in a direction opposite to the said produced twist in the line.

2. In a fishing rod and reel, a fishing rod, a reel mounted thereon movable between a position with the reel axis transverse to the rod and a position with the reel axis parallel to the rod, a fishing line on said reel guided by said rod, means for reeling the reel to wind or rewind the line when the reel is in the transverse axis position, the reel when in said parallel axis position permitting unwinding of said line from the end of said reel without spinning or reeling the wheel, and a device for eliminating the twist in the line produced by the unwinding of the same from the reel end, said device comprising a water wheel attached to the cast part of the line, said water wheel being rotative in the water in a direction opposite to the said produced twist in the line.

3. In a fishing rod and reel, a fishing rod, a reel mounted thereon, a fishing line on said reel guided by said rod, means for reeling the reel to wind or rewind the line, means for permitting unwinding of said line from the end of said reel without spinning or reeling the wheel, and a device for eliminating the twist in the line produced by the unwinding of the same from the reel end, said device comprising a water wheel attached to the cast end of the line, said water wheel having vanes therein directed to cause the water wheel to rotate in a direction opposite to the said produced twist in the line when the line is pulled in the water.

4. A device for eliminating the twist in a fishing line produced by unwinding the line from the end of a reel, said device comprising a water wheel attached to the cast part of the line, said water wheel having its vanes directed to cause the water wheel to rotate in the water in a direction opposite to the said produced twist in the line.

WILLIAM TEITSMA.